United States Patent [19]

Hagiwara

[11] 4,126,545
[45] Nov. 21, 1978

[54] APPARATUS AND METHOD FOR TREATING WASTE-CONTAINING LIQUORS

[75] Inventor: Hiroshi Hagiwara, Moriyama, Japan

[73] Assignee: Research Corporation, New York, N.Y.

[21] Appl. No.: 824,255

[22] Filed: Aug. 12, 1977

[30] Foreign Application Priority Data

Aug. 24, 1976 [JP] Japan .................................. 113063[U]

[51] Int. Cl.$^2$ .............................................. C02C 1/04
[52] U.S. Cl. ......................................... 210/14; 210/17; 210/150; 210/196; 210/208
[58] Field of Search ........................ 195/139, 142, 143; 210/2–9, 14, 15, 17, 63 R, 150, 151, 194, 195 R, 205, 219, 220; 261/84, 91

[56] References Cited

U.S. PATENT DOCUMENTS

| | | |
|---|---|---|
| 2,458,163 | 1/1949 | Hays ...................................... 210/151 |
| 3,265,589 | 8/1966 | Steel ...................................... 195/143 |
| 3,563,888 | 2/1971 | Klock ..................................... 210/14 |
| 3,598,726 | 8/1971 | Welch .................................... 210/151 |
| 3,732,160 | 5/1973 | Klock ..................................... 210/150 |
| 3,837,492 | 9/1974 | DiBello ................................. 210/150 |
| 3,875,058 | 4/1975 | Nordgard ............................. 210/151 |
| 3,878,097 | 4/1975 | Mochizuki et al. ................... 210/151 |
| 3,886,074 | 5/1975 | Prosser .................................. 210/150 |
| 3,932,273 | 1/1976 | Torpey et al. ......................... 210/17 |

FOREIGN PATENT DOCUMENTS

43-9,298  4/1971  Japan ...................................... 210/150

Primary Examiner—Charles N. Hart
Assistant Examiner—Peter A. Hruskoci
Attorney, Agent, or Firm—Cushman, Darby & Cushman

[57] ABSTRACT

Waste containing liquor is treated in a device containing a plurality of submerged, slowly rotating bacterial growth surfaces which are spaced apart from each other, extend in a horizontal plane and are mounted on a vertical, rotating shaft. The bacterial growth surfaces, which may be in the configuration of a substantially flat disk, are maintained submerged in a waste water treatment tank as the waste-containing liquor is passed over, through and around them. The tank may be provided with several sets of growth areas and shafts which are interleafed and separated from each other.

10 Claims, 5 Drawing Figures

APPARATUS AND METHOD FOR TREATING WASTE-CONTAINING LIQUORS

BACKGROUND OF THE INVENTION

This invention relates to an apparatus and process for treating waste-containing liquor wherein organic waste containing liquor is purified by bacterial treatment.

Various apparatus are already known for purifying waste-containing liquor by bringing such liquors into contact with a bacterial culture. One such device is described in U.S. Pat. No. 3,563,888 in which waste-containing liquors are circulated in a vertical direction through a container filled with a porous filter media having bacterial cultures growing thereon. Another example is the device described in U.S. Pat. No. 3,732,160 in which a plurality of stationary filter media, horizontally fixed and appropriately spaced apart inside a purifying tank, are provided to promote contact between the waste material in the liquor and bacteria on the filter media. The system provides for purifying the waste-containing liquor by circulating and recirculating it between the filter media in the purifying tank. With waste liquor treatment apparatus of this type, however, the bacteria tend to multiply rapidly and thus fill up the space between filter media which causes an increase in the hydraulic resistance of the waste-containing liquor and, at times, mechanical plugging of certain portions of the space between filter media. As a result, the flow rate of the waste-containing liquor diminishes and and this, in turn, results in a decrease in the amount of oxygen supplied to the bacteria and with it an attendant decrease in the frequency of contact between the bacteria and the waste material in the waste-containing liquor. The over-all efficiency of the purifying treatment is thereby decreased.

The apparatus and method of the present invention are directed towards overcoming the drawbacks as mentioned above. The device is illustrated and described in more detail with reference to the illustrated embodiments and attached drawings.

DETAILED DESCRIPTION OF THE INVENTION

The present invention will now be described with regard to the attached drawings.

Figure 1:
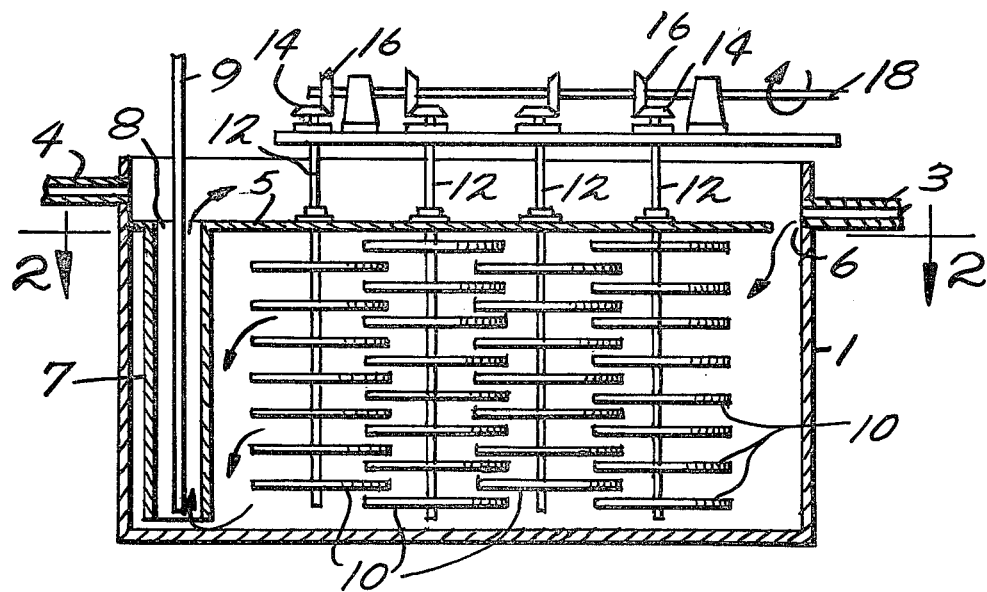
FIG. 1 is a cross-sectional front view illustrating a first embodiment of the invention.
Figure 2:
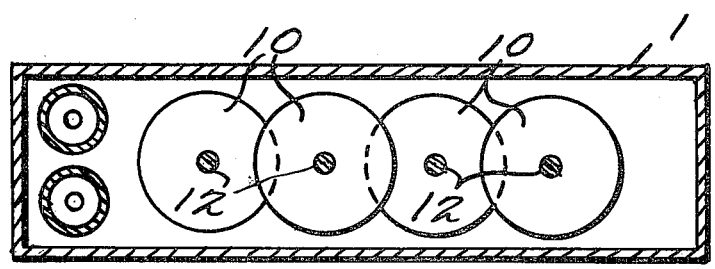
FIG. 2 is a cross-sectional top plan view of the device of FIG. 1 taken along lines 2—2.

In the first embodiment illustrated in FIGS. 1 and 2, tank 1 is an apparatus according to the invention for purifying waste liquor containing organic wastes. The treatment tank 1 is provided with a supply pipe or inlet 3 for supplying the waste-containing liquor to the tank at one end and towards the upper portion and with a discharge pipe or outlet 4 for discharging the treated waste-containing liquor positioned on the opposite side of the container 1 at a position somewhat higher than that of the supply pipe 3. A deck plate 5 is placed inside the treatment tank 1 horizontally at a level slightly lower than that of the supply pipe 3 and provided with an opening 6 in the vicinity of the supply pipe 3 while an air lift pump 7 having an opening 8 at the top is suspended vertically from the deck plate 5 in the vicinity of the discharge pipe 4. A passageway is formed between the lower end of the air lift pipe 7 and the bottom portion of the treatment tank 1, which provides for circulation of the waste-containing liquor inside the treatment tank. An air pipe 9 is positioned generally along the axis and terminating towards the bottom portion of the air lift pipe 7. The other end of the air pipe 9 is connected to an air compressor which is not shown.

A plurality of rotatable filter media 10 are placed inside of the treatment tank 1 below deck 5. These filter media, as they are termed, are surfaces upon which active bacterial cultures attach and grow. They are submerged and hence are not directly exposed to the atmosphere so that the growing bacterial culture is highly porous and flocculant. In the embodiment illustrated the filter media are in the form of large, flat disks, however other configurations and shapes may be employed. Each filter media disk 10 is fixed to its respective vertical rotatable shaft 12 which is suspended from the deck 5 or optionally secured to the floor of the treatment vessel. Each shaft 12 is provided with a bevel gear 14 which, in turn, contacts its matching bevel gear 16 which is connected to a horizontal shaft 18. Horizontal shaft 10 is connected to an electric motor (not shown) which rotates bevel gears 14, 16 vertical shaft 12 and filter media 10 within the treatment tank 1. It will be understood that during operation of the system the filter media 10 are submerged in the waste-containing liquor as the liquor level in the tank is at least as high as deck plate 5 which is above the uppermost filter media disks.

Each vertical shaft 12 and its attached filter media 10 rotates in a direction opposite to the direction of rotation of its neighboring shaft as determined by positioning of the respective bevel gears 16. The gear arrangement may be changed, if desired, so that the filter media 10 all rotate in the same direction. The speed of rotation is usually between about 0.5 up to about 5 revolutions per minute (r.p.m.) depending upon conditions in the treatment tank 1, the nature of the waste liquor being treated and the like. The filter media 10 are arranged on vertical shafts 12 such that the plates are staggered with respect to each other and there is an overlap between neighboring sets of rotating plates. The distance between plates may be as small as one-half of one inch, or larger, again depending upon the treatment conditions involved. The extent of filter media overlap is a matter of design choice and may be more or less than the specific embodiments that are illustrated.

During operation of the embodiment of the invention illustrated in FIGS. 1 and 2, waste liquor containing organic wastes flows continuously into the treatment tank 1, the flow of which is indicated by small arrows in the figure, through the supply pipe 3, and the organic wastes are metabolized by bacterial cultures which adhere weakly to each of the filter media or plates 10. In this manner the waste-containing liquor is purified while at the same time the bacteria multiply in the spaces between the filter media 10. The filter media 10 are maintained totally under the surface of the waste-containing liquid as liquid recycling occurs upwards from the airlift pipe 8, across top deck 5 and into the filter media area via opening 6.

As the filter media 10 are put into motion by the rotating vertical shaft 12 the porous and flocculant bacterial cultures thereon are subjected to both and external forces which are generated by the turbulence of the waste-containing liquor as it passes through the tank and over the filter media. Those bacterial cultures weakly adhering to the filter media 10 are also subjected to a centrifugal force as the filter media rotate. As a result, the porous and flocculant bacterial cultures that are multiplying in the spaces between the various overlapping filter media are prevented from becoming fixed to the filter media such that excessive or localized multiplication of bacteria no longer occurs. This design also eliminates or substantially reduces mechanical plugging of the waste treatment system.

The thus treated waste-containing liquor having reduced organic wastes therein rises inside the airlift pipe 7 as it is pushed up by air bubbles which are generated by compressed air released from the lower end of the air pipe 9 into the lift pipe 7. During operation the waste-containing liquor receives a partial supply of oxygen during this upward trip, reaches the upper end of the air lift pipe 8, flows over the deck plate 5 towards the opening 6, passes downwardly through the opening 6 and again flows through the space between the filter media 10 towards the center of the purifying tank 1. In the recycle it flows through the space between the filter media, reaches the lower end of the airlift pipe 7 and again rises inside the air lift pipe 7 as before. The waste-containing liquor is thus purified as it circulates and recirculates in the manner described.

During the course of treatment the waste-containing liquor is recirculated several times providing the capability of a substantial recirculation to throughput ratio. The recirculation ratio is equal to the quantity of waste liquor or water circulated through the airlift pump in the tank per unit of time divided by the quantity of liquor or waste water passing through the treatment process per unit of time. This recirculation ratio is highly variable and is selected in accordance with the nature and conditions of the impurities in the waste liquor to be metabolized. From the viewpoint of economical operation it is always desirable to minimize the quantity of air supplied to the airlift pipe, and in turn the volume of liquor or water circulated in the tank. The system is designed such that the circulating liquor flows relatively evenly through the spaces of the submerged filter in the tank thus facilitating the oxygen uptake into the system. Oxygen is preferably utilized at a rate as high as possible for metabolism of the waste material.

Using a fixed filter media, as illustrated in U.S. Pat. No. 3,732,160, it has been found that with closely spaced plates, say about two inches apart, it is difficult to maintain the flow of circulating liquor in the vessel, even in continuous operations, apparently due to an uneven growth of bacteria culture between the spaced plates. Thus an object of the present invention is to insure not only an even initial flow of circulating liquor in the vessel but also to maintain that flow for a substantial period of time, i.e. at least several months without occlusion of passageways in and around the filter media. The extent of bacterial build-up varies, of course, with the nature and conditions under which the waste impurities are treated. The design of the presence system using moving filter media and bacterial growth areas serves to substantially reduce uneven bacterial build-up but also provides an over-all increase in surface contact between the bacteria culture and the circulating waste water.

A portion of the waste-containing liquor so purified is discharged from the discharge pipe 4 which is located at a position somewhat higher than the supply pipe 3 with respect to the liquid level in the tank. In this process, as mentioned above, each filter media 10 and the space between the several cooperating filter media have bacteria or porous and flocculant bacterial cultures attached to and adequately multiplying on them due to rotation of said filter media 10. Once the bacteria are established, the waste-containing liquor circulates through, around and in contact with these porous and flocculant bacterial cultures at a suitable flow rate. During this procedure the bacteria take in oxygen dissolved in the waste-containing liquor on the one hand and contact the organic wastes in the waste-containing liquor on the other, thus repeatedly undergoing metabolism and multiplication. Moreover, by mechanical action of the slowly rotating disks or plates 10 any excess of the porous and flocculant bacterial cultures is broken up to be distributed roughly evenly and optimally. While each of the rotating axes 10 rotates in the opposite direction with respect to its neighbor, virtually the same effect can also be produced when the two neighboring axes rotate in the same direction.

Figure 3:
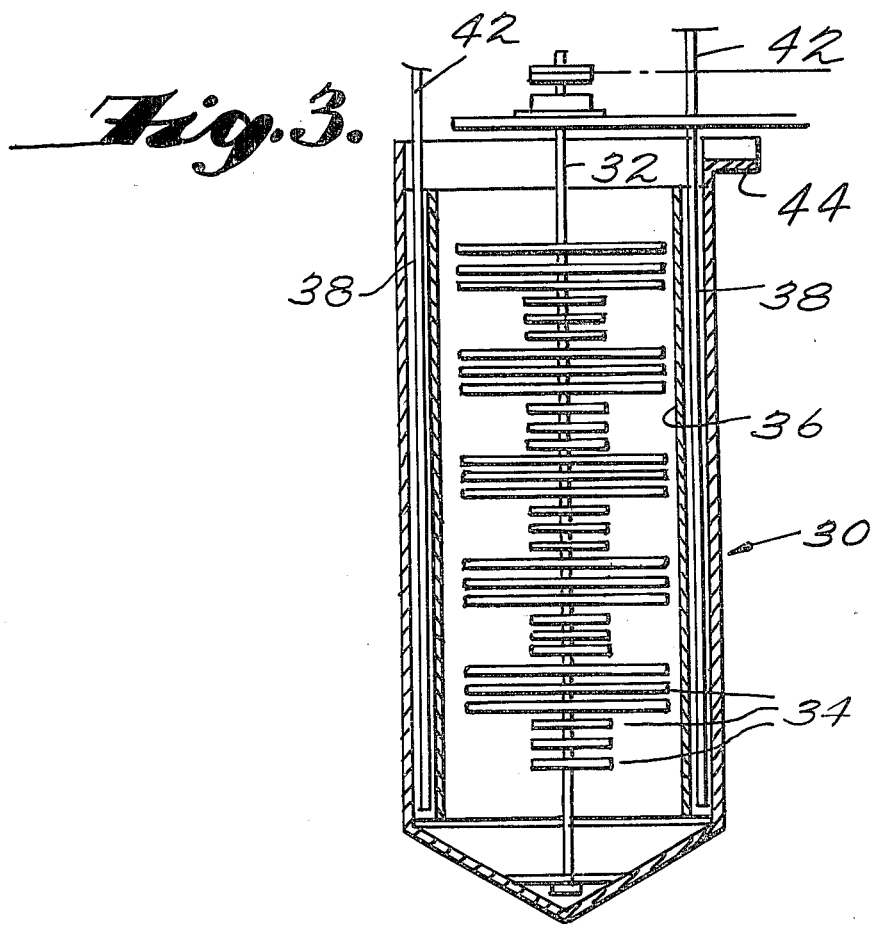
FIG. 3 is a cross-sectional front view illustrating a second embodiment of the invention.
Figures 4, 5:
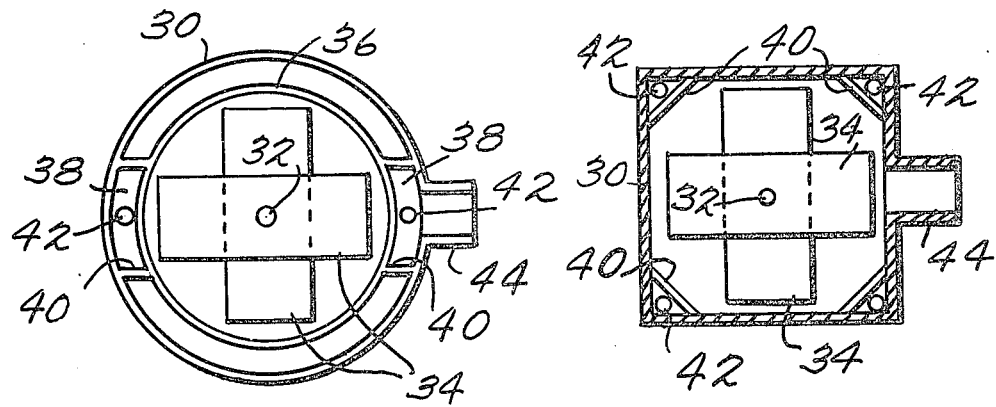
FIG. 4 is a cross-sectional top plan view of the device of FIG. 3 taken along lines 3—3.
FIG. 5 is a cross-sectional top plan view of a third embodiment of the invention.

Another embodiment of the present invention is shown in FIGS 3–5. Referring now to FIG. 3, a purifying tank or vessel 30 is provided in the embodiment illustrated with only one rotating axis 32 having a plurality of filter media or plates 34 attached thereto. In this instance, the purifying tank 30 may be made cylindrical in shape, as shown in FIG. 4, or square, as shown in FIG. 5. With reference to the cylindrical structure, an inner cylinder 36 is provided concentrically with and at a suitable distance from the inside wall of the purifying tank 30. The upper end of the inner cylinder 36 is positioned somewhat lower than the upper end of the purifying tank 30, the lower end reaching near the bottom of the purifying tank 30. Positioned between the purifying tank 30 and the inner cylinder 36 two airlift channels 38 are formed, preferably at diagonally opposite positions, each such airlift channel being defined by the purifying tank 30, the inner cylinder 36 and two suitably spaced partition walls 40. Several airlift pumps may be provided depending upon the nature of the waste water treated. They are preferably, but not necessarily, disposed fairly uniform about the circumference of the cylinder. An air channel 42 is positioned roughly through the center of the airlift pump 38 with one end connected to an air compressor (not shown) and the lower end open near the bottom of the airlift pipe 38.

In the embodiment as shown in FIG. 5 where the purifying tank 30 is in the shape of a square column, four such airlift pipes 38 are formed at the four corners of the square by providing suitable partition walls 40 and air pipes 42 which are inserted into the airlift pipes 38 in the same manner as described above.

With reference to the embodiments shown in FIGS. 3–5, a rotating axis is provided at the center of the tank or vessel which is rotated by an electric motor (not shown) or by a mechanical drive means, such as a belt or the like. The rotating axis 32 is provided with a plurality of attached rectangular filter media 34 disposed horizontally and at suitable intervals in the vertical direction. The shaft carrying the filter media is rotatable inside the inner cylinder 36 of the purifying tank 30 of FIGS. 3, 4 or inside the square-shaped purifying tank of FIG. 5. In the illustrated device, the rectangular filter media are positioned and attached in sets of three at right angles with respect to the rotating axis 32 and parallel to the neighboring set of filter media. The filter media or bacterial growth areas are positioned below the surface of the waste liquid under treatment and rotate at a fairly low rate of speed of about 0.5 up to 5 or so revolutions per minute.

In operation, the waste liquor containing organic wastes therein is supplied to the purifying tank 30 via a waste liquor supply pipe (not shown), purified in substantially the same manner as described above with respect to FIGS. 1-2, and discharged successively through the discharge pipe 44. It will be appreciated that with respect to the embodiments of the invention shown in FIGS. 1-2 the flow of liquid is in a substantially horizontal direction whereas the flow of liquid in FIGS. 3-5 is in a vertical direction.

The above described embodiments of the invention illustrate a device including rotating filter media provided inside a purifying tank or vessel. These rotating filter media subject any porous and flocculant bacterial cultures multiplying in the space between the various filter media to an external force caused by the turbulence of the waste-containing liquor and the bacteria weakly adhering to the filter media to a centrifugal force. Fixation of the porous and flocculant bacterial cultures multiplying in the space between filter media is inhibited, which not only reduces mechanical plugging markedly, but also prevents excessive multiplication of bacteria and as a consequence prevents reduction in the flow rate of the waste-containing liquor through the spaced between filter media. As a result, the amount of oxygen supplied to the bacteria or the frequency of contact between the bacteria and the organic wastes in the waste-containing liquor does not diminish and the efficiency of purifying treatment increases.

The number and specific types of units employed in a given waste-water treatment project will vary depending upon the nature of the waste material to be treated and the equipment available. Thus two or more units or vessels according to the present invention may be used, for example connected in series such that as the waste water is serially passed from one unit to the next it is progressively improved in quality. In this manner each unit adjusts to the waste concentration remaining in the previous unit and carries out additional metabolism. A plurality of units may also be connected in parallel depending upon load conditions. A preferred arrangement is to provide a series of 2 or 3 units, the first unit which receives the waste material for initial treatment, is according to the present invention, preferably the embodiment shown in FIGS. 1-2, and the succeeding units are constructed in the style of such units, disclosed in U.S. Pat. No. 3,732,160. In this arrangement substantial mechanical plugging of the equipment is avoided in the first unit and the remaining units are allowed to continue processing the waste material in an efficient manner.

What is claimed is:

1. In an apparatus for treating waste-containing liquor comprising in combination:
   a vessel;
   means for introducing waste-containing liquor into said vessel;
   a bacterial growth area within said vessel surrounded and submerged by said liquor;
   means defining an open fluid passageway adjacent and through said bacterial growth area;
   pumping means operatively associated with said passageway including means to provide a flow of oxygen-containing gas through said passageway,
   said passageway having inlet means and outlet means spaced apart from each other within said vessel to provide in cooperation with said bacterial growth area a path within said vessel for the continuous circulation and recirculation of liquor in contact with said bacterial growth area within said vessel; and
   second outlet means operatively connected to said path for withdrawal from said vessel of at least some of the liquor circulating in said path;
   the improvement wherein said bacterial growth area includes a plurality of spaced-apart bacterial growth surfaces extending in a horizontal plane and mounted on a vertical, rotatable shaft;
   a plurality of said shafts having said growth surfaces thereon in operative, rotatable cooperation with each other, said growth surfaces on a given shaft spaced in a manner to cooperate and at least partially overlap said growth surfaces on at least one adjacent shaft, each shaft and its set of bacterial growth surfaces is positioned adjacent its neighboring shaft such that when rotated the circumference of each set of bacterial growth areas overlaps the circumference of each set of bacterial growth areas of the neighboring shaft;
   rotating means connected with said shafts for slowly rotating said shafts and growth surfaces,
   said bacterial growth area thus defined by sets of horizontal, rotatable bacterial growth surfaces which are interleaved and separated from each other providing fluid passageways therebetween for circulation and recirculation of said liquor.

2. Apparatus as claimed in claim 1, wherein means are provided for rotating each set of bacterial growth surfaces in a direction opposite that of the adjacent, overlapping rotating bacterial growth surfaces.

3. In an apparatus for treating waste-containing liquor comprising, in combination:
   a vessel;
   means for introducing waste-containing liquor into said vessel;
   a bacterial growth area within said vessel surrounded and submerged by said liquor,
   means defining an open fluid passageway adjacent and through said bacterial growth area;
   pumping means operatively associated with said passageway including means to provide a flow of oxygen-containing gas through said passageway,
   said passageway having inlet means and outlet means spaced apart from each other within said vessel to provide in cooperation with said bacterial growth area a path within said vessel for the continous circulation and recirculation of liquor in contact with said bacterial growth area within said vessel, and
   second outlet means operatively connected to said path for withdrawal from said vessel of at least some of liquor circulating in said path,
   the improvement wherein said bacteria growth area includes a plurality of horizontally disposed, overlapping spaced-apart bacterial growth surfaces of substantial surface area, mounted on a vertical, rotatable shaft which growth surfaces are submerged in and slowly rotate and contact said waste-containing liquor, and rotating means connected with said growth surfaces for slowly rotating said shaft.

4. Apparatus for treating waste-containing liquor comprising, in combination:

a vessel;

means for introducing waste-containing liquor into said vessel;

a bacterial growth area within said vessel and surrounded and submerged by said liquor;

means defining an open fluid passageway adjacent and through said bacterial growth area;

pumping means operatively associated with said passageway including means to provide a flow of oxygen-containing gas through said passageway;

said passageway having inlet means and outlet means spaced apart from each other within said vessel to provide in cooperation with said bacterial growth area a path within said vessel for the continous circulation and recirculation of liquor in contact with said bacterial growth area within said vessel;

second outlet means operatively connected to said path for withdrawal from said vessel of at least some of the liquor circulating in said path;

said bacterial growth areas including a plurality of vertically disposed, rotatable shafts, each such shaft having mounted thereon a plurality of bacterial growth surfaces of substantial surface area extending in a horizontal plane and spaced apart from each other, each shaft and its set of bacterial growth surfaces is positioned adjacent its neighboring shaft such that when rotated the circumference of each set of bacterial growth areas overlaps the circumference of each set of bacterial growth areas of the neighboring shaft, means connected to said shafts for rotating said bacterial growth areas.

5. Apparatus as claimed in claim 4 wherein each shaft and its set of bacterial growth surfaces is positioned adjacent its neighboring shaft such that when rotated, the circumference of each set of bacterial growth areas overlaps the circumference of the set of bacterial growth areas of the neighboring shaft.

6. Apparatus as claimed in claim 5, wherein means are provided for rotating each set of bacterial growth surfaces in a direction opposite that of the adjacent, overlapping rotating bacterial growth surfaces.

7. Apparatus as claimed in claim 4 wherein a portion of said passageway is vertical and is arranged adjacent to said bacterial growth surfaces with said inlet means of said passageway being disposed adjacent the bottom of said vessel and said first outlet means being spaced from the vertical portion of said passageway by the length of said filtering medium and disposed adjacent the upper part of said filtering medium, and further wherein another portion of said passageway is horizontal and extends from said vertical portion of said passageway to said first outlet means said horizontal portion being disposed above said bacterial growth surfaces and separated therefrom by a wall thereby providing for flow of liquor from said vertical portion of said passageway to said first outlet means.

8. A method of treating waste-containing liquor comprising the steps of:

providing a first vessel with a completely submerged bacterial growth area therein having horizontally spaced entrance and discharge portions, said entrance portion located at one end of said bacterial growth area providing inlet for the introduction of liquor into the bacterial growth area and said discharge portion located at the opposite end of said bacterial growth area providing outlet for the discharge of liquor from said bacterial growth area and a separate open fluid passageway in communication with said bacterial growth area through said outlet portion;

providing a bacterial growth area in said vessel which includes a plurality of spaced-apart bacterial growth surfaces extending in a horizontal plane and mounted on a vertical, rotatable shaft, and providing a plurality of said shafts having bacterial growth surfaces thereon in operative rotation co-operating with each other at least partially overlapping said growth surfaces on at least one adjacent shaft;

rotating said shafts and said bacterial growth surfaces mounted thereon;

introducing a waste-containing liquor into said vessel;

introducing an oxygen-containing gas into said passageway to provide a pumping action in said passageway whereby said gas and said liquor flow together in a single direction through said passageway;

continuously conducting substantially all of said liquor from said entrance portion to said discharge portion along an essentially horizontal path through said bacterial growth area;

passing said liquor over and around the horizontal, spaced-apart bacterial growth surfaces which are interleaved and separated from each other while said growth surfaces are rotating;

continuously circulating said liquor within said vessel and horizontally through said bacterial growth area and then through said passageway by means of said pumping action; and continuously withdrawing a portion of said circulating liquor from said vessel.

9. The method as claimed in claim 8 wherein each set of bacterial growth surfaces is rotated in a direction opposite that of the adjacent, overlapping rotating bacterial growth surfaces.

10. A method of treating waste-containing liquor comprising the steps of:

providing a vessel with a bacterial growth area therein having vertically spaced apart entrance and discharge portions thereof in which said bacterial growth area is maintained completely submerged in said liquor;

providing a passageway in communication with the discharge portion of said first vessel and terminating near the entrance portion of said vessel;

providing in said vessel a rotating bacterial growth area which includes a plurality of spaced apart, overlapping bacterial growth surfaces extending in a horizontal plane and mounted on a vertical, rotating shaft, and means connected to said shaft to slowly rotate same;

introducing waste-containing liquor into said vessel;

slowly rotating said shaft and said bacterial growth surfaces within said waste-containing liquor;

introducing an oxygen containing gas into said passageway to provide a pumping action in said passageway whereby said gas and said liquor flow together in a single upward direction through said passageway and said liquor flows in a downward direction over and around said rotating, submerged bacterial growth surfaces;
continously circulating said liquor within said vessel vertically through said bacterial growth area and then through said passageway by means of said pumping action, and continously withdrawing from said vessel a portion of said circulating liquor.

* * * * *